United States Patent
Sapir

(10) Patent No.: US 9,810,776 B2
(45) Date of Patent: Nov. 7, 2017

(54) LIDAR SCANNER APPARATUS

(71) Applicant: Irvine Sensors Corp., Costa Mesa, CA (US)

(72) Inventor: Itzhak Sapir, Irvine, CA (US)

(73) Assignee: Irvine Senors Corp., Costa Mesa, CA (US)

( * ) Notice: Subject to any disclaimer, the term of this patent is extended or adjusted under 35 U.S.C. 154(b) by 0 days.

(21) Appl. No.: 14/561,596

(22) Filed: Dec. 5, 2014

(65) Prior Publication Data

US 2017/0115380 A1    Apr. 27, 2017

(51) Int. Cl.
| | |
|---|---|
| *G02B 26/06* | (2006.01) |
| *G01S 7/481* | (2006.01) |
| *G01S 17/42* | (2006.01) |
| *G01S 17/89* | (2006.01) |
| *G02B 26/10* | (2006.01) |
| *G02B 26/08* | (2006.01) |

(52) U.S. Cl.
CPC ............ *G01S 7/4817* (2013.01); *G01S 17/42* (2013.01); *G01S 17/89* (2013.01); *G02B 26/0816* (2013.01); *G02B 26/105* (2013.01)

(58) Field of Classification Search
CPC . G02B 26/0816; G02B 26/105; G01S 7/4817; G01S 17/42; G01S 17/88; G01S 17/89
USPC ......... 359/197.1–199.1, 201.1, 212.1–215.1, 359/221.1–221.3, 223.1, 225.1–226.2
See application file for complete search history.

(56) References Cited

U.S. PATENT DOCUMENTS

| | | | | |
|---|---|---|---|---|
| 5,898,482 | A * | 4/1999 | Yamabuchi | B60T 7/22 180/169 |
| 2009/0260511 | A1* | 10/2009 | Melnychuk | F41G 3/147 89/1.11 |

* cited by examiner

*Primary Examiner* — James Phan

(57) ABSTRACT

A mechanical scanning system for the illuminating laser beam and return light in LIDAR imaging systems. The scanning system includes a flat mirror having reciprocating rotary motion around a horizontal axis for vertical scan of the illuminating laser beam and return light. The reciprocating rotary motion of the mirror is driven by a continuously rotating motor, a cam mounted on the motor and a follower connected to the mirror and driven by the cam. An encoder is connected to the mirror's shaft and provides position indication to the imaging control electronics.

3 Claims, 2 Drawing Sheets

Figure 1 – Schematic view of laser beam scanner assembly

LIDAR SCANNER APPARATUS

CROSS-REFERENCE TO RELATED APPLICATIONS

This application claims the benefit of U.S. Provisional Patent Application No. 61/921,524, filed on Dec. 29, 2013 entitled "LIDAR Scanner Apparatus" pursuant to 35 USC 119, which application is incorporated fully herein by reference.

STATEMENT REGARDING FEDERALLY SPONSORED RESEARCH AND DEVELOPMENT

N/A

DESCRIPTION

1. Field of the Invention

The invention relates generally to the field of electronic imaging systems. More specifically, the invention relates to a scanning assembly for use in a LIDAR imaging system.

2. Description of the Prior Art

Prior art mechanical laser beam scanners for LIDAR imaging systems include two types. The first incorporates a flat mirror having reciprocating rotational motion around a horizontal axis. The second uses an assembly of flat mirrors that are mounted on a drum that rotates around the horizontal axis of the system. Although both systems provide good optical performance, they both have major deficiencies. The reciprocating mirror has limited maximum scan speed due to exponential increase in required drive force and motor power consumption. The continuously rotating drum/mirrors assembly loses the beam when one mirror rotates out and another rotates into the line of sight thus not having continuous beam scanning capability.

DETAILED DESCRIPTION OF THE INVENTION

In one type of a prior art LIDAR system, a laser beam is used to scan a scene of interest vertically while the complete assembly rotates about a vertical axis to provide 360° (or part of it) coverage of a field of view.

The vertical scan of the laser beam of this form of system is achieved in one of two ways. The first incorporates a flat mirror having reciprocating rotational motion around a horizontal axis. The second uses an assembly of flat mirrors that are mounted on a drum that in turn rotates around the horizontal axis of the system.

In both cases, the mirrors are used for steering the exit beam to illuminate the scene and for steering the return beam into the optical system and to the FPA (Focal Plane Array). In order to collect all the light reflected from the scene with minimal loss of energy, the mirror is typically at least as large as the collecting lens.

The above single mirror configuration with reciprocating rotational motion in prior art scanning LIDARs is typically driven by a reciprocating rotary motor (a galvo-motor). The nature of this type of motion necessarily requires acceleration and deceleration, which in turn results high power consumption at high frequencies.

Although this is a small form-factor solution for a mirror/motor assembly, the overall size of such a system (including electronic driver assemblies and power converters), speed limitations and high power consumption present system drawbacks and performance limitations.

The above second approach using a continuous rotation multi-mirror assembly is much better regarding power consumption and potential high scan speed (because of the use of a continuous rotation DC motor), but the size of a multi-mirror assembly, with each mirror the size of the single mirror in the first approach, makes it an impractical solution.

A deficiency in the first approach is power consumption and performance limitations associated with the way the reciprocating rotational motion is generated. A deficiency with the second approach is the size of the multi-mirror assembly. In addition, this approach presents another performance limitation because there is no continuous steering of the beam and scene. A time gap is created when one mirror in the rotating assembly rotates out of line of sight and another rotates in.

The invention herein combines the size advantage of the reciprocating mirror/motor assembly without the penalty of related drive electronics (size and power) while providing the advantage of using a continuous-rotation DC motor with its related low power and high speed.

No such solution provided by the instant invention is known to be used in the prior art for a LIDAR application.

The laser beam scanner of the invention for scanning LIDAR imaging systems desirably combines size, power and scanning speed advantages using a single mirror having reciprocating rotary motion and is driven by a continuous rotation DC motor through a cam and follower linkage.

Figure 1:
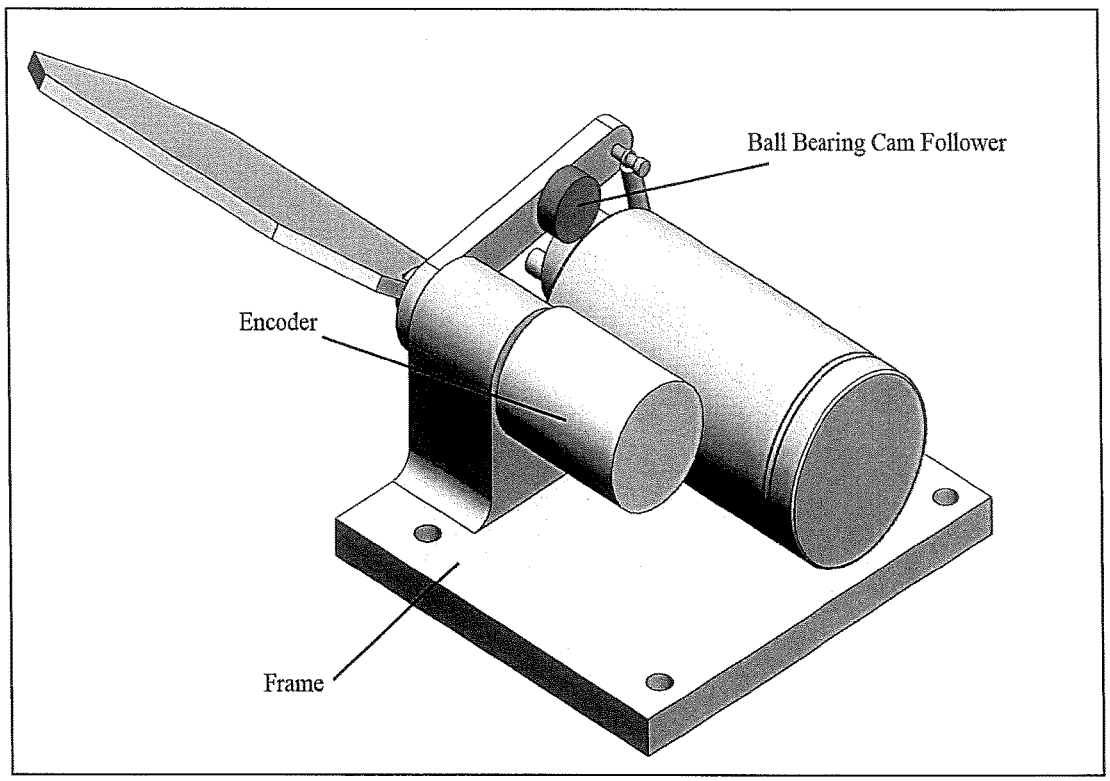
FIG. 1 shows a first perspective view of a preferred embodiment of the scanning system of the invention.
Figure 2:
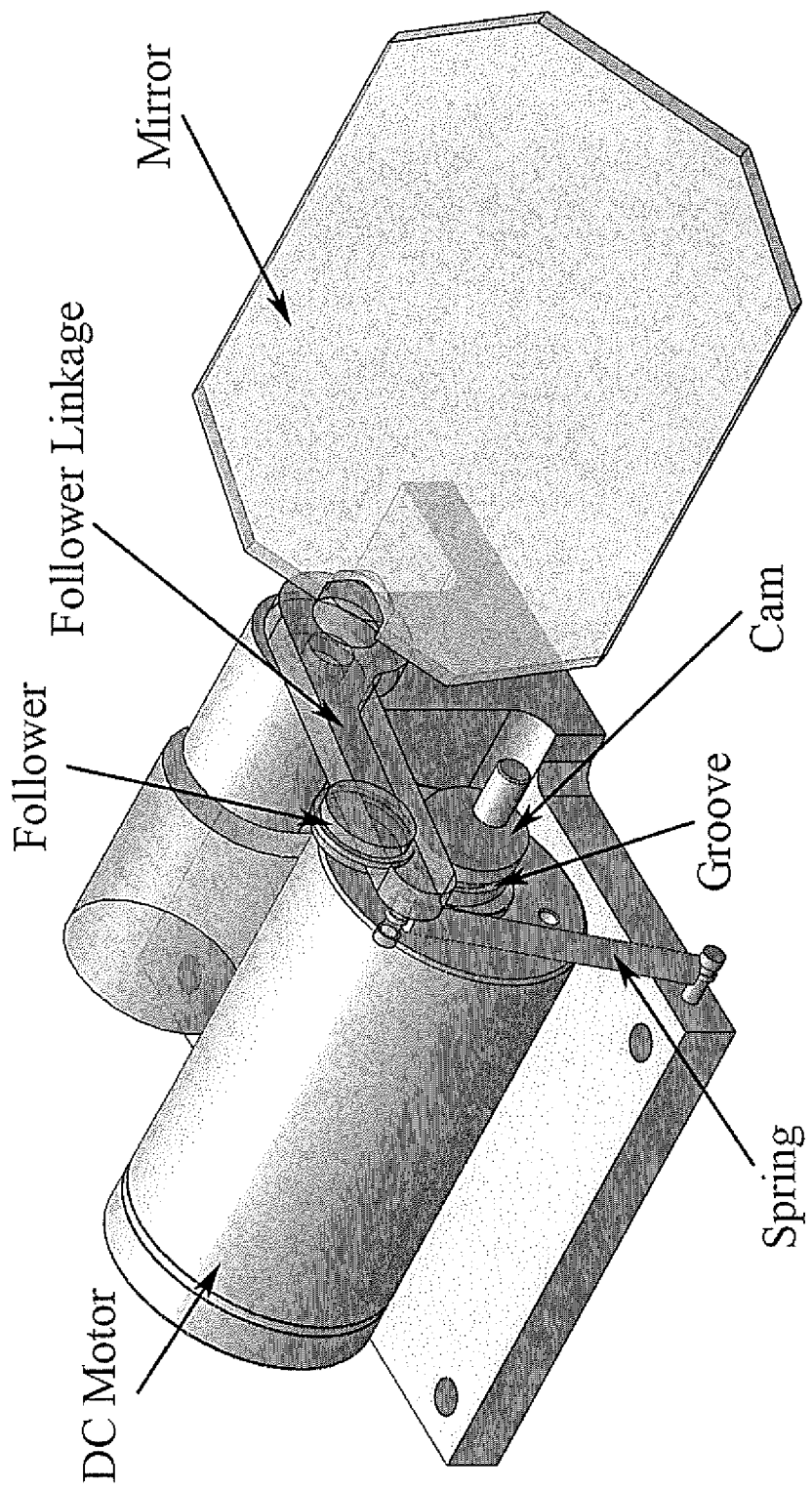
FIG. 2 shows a second perspective view of a preferred embodiment of the scanning system of the invention depicting the follower of the invention connected to the scan mirror and driven by the cam wherein the cam is in the form of a groove formed in a rotating disk and wherein the follower moves inside the groove.

As illustrated in the preferred embodiment of FIGS. 1 and 2, the cam of the invention is powered by a continuous-rotation DC motor that is linked with a ball bearing follower mounted on a pivoting arm that provides rotational motion to the mirror.

A tension spring of other tensioning means ensures continuous contact between the cam and follower at different scanning speeds. The shape of the cam dictates the motion profile.

An encoder may be connected to the mirror shaft to provide mirror position indication as needed by the LIDAR system.

FIGS. 1 and 2 below illustrate a preferred embodiment of the LIDAR assembly of the invention.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by any claims in any subsequent application claiming priority to this application.

For example, notwithstanding the fact that the elements of such a claim may be set forth in a certain combination, it must be expressly understood that the invention includes other combinations of fewer, more or different elements, which are disclosed in above even when not initially claimed in such combinations.

In a first aspect of the invention, a scanning system for a laser beam and a return light in a LIDAR imaging system is disclosed. The scanning system may be comprised of a flat mirror having a reciprocating rotary motion around a horizontal axis for a vertical scan of an illuminating laser beam and a return light. The reciprocating rotary motion of the mirror may be driven by a continuously rotating motor, a cam mounted on the motor and a follower connected to the mirror and driven by the cam.

In a second aspect of the invention, the follower may include a bearing.

In a third aspect of the invention, the follower may include a spring for pressing the follower against the cam.

In a fourth aspect of the invention, the cam may be replaceable for allowing different motion profiles.

In a fifth aspect of the invention, the spring may be a metal wire spring.

In a sixth aspect of the invention, the spring is a compressed gas spring.

In a seventh aspect of the invention, the cam may be in the form of a groove formed in a rotating disk.

In an eighth aspect of the invention, the follower may move inside the groove.

In a ninth aspect of the invention, an encoder may be connected to a shaft of the mirror.

In a tenth aspect of the invention, the encoder may be an optical encoder.

In an eleventh aspect of the invention, the optical encoder may comprise a digital output.

The words used in this specification to describe the invention and its various embodiments are to be understood not only in the sense of their commonly defined meanings, but to include by special definition in this specification structure, material or acts beyond the scope of the commonly defined meanings. Thus, if an element can be understood in the context of this specification as including more than one meaning, then its use in a subsequent claim must be understood as being generic to all possible meanings supported by the specification and by the word itself.

The definitions of the words or elements of any claims in any subsequent application claiming priority to this application should be, therefore, defined to include not only the combination of elements which are literally set forth, but all equivalent structure, material or acts for performing substantially the same function in substantially the same way to obtain substantially the same result. In this sense, it is therefore contemplated that an equivalent substitution of two or more elements may be made for any one of the elements in such claims below or that a single element may be substituted for two or more elements in such a claim.

Although elements may be described above as acting in certain combinations and even subsequently claimed as such, it is to be expressly understood that one or more elements from a claimed combination can in some cases be excised from the combination and that such claimed combination may be directed to a subcombination or variation of a subcombination.

Insubstantial changes from any subsequently claimed subject matter as viewed by a person with ordinary skill in the art, now known or later devised, are expressly contemplated as being equivalently within the scope of such claims. Therefore, obvious substitutions now or later known to one with ordinary skill in the art are defined to be within the scope of the defined elements.

Any claims in any subsequent application claiming priority to this application are thus to be understood to include what is specifically illustrated and described above, what is conceptually equivalent, what can be obviously substituted and also what essentially incorporates the essential idea of the invention.

I claim:

1. A scanning system for a laser beam and a return light in a LIDAR imaging system comprising:
    a flat mirror having reciprocating rotary motion around a horizontal axis for a vertical scan of an illuminating laser beam and a return light, said reciprocating rotary motion of said mirror driven by a continuously rotating motor, a cam mounted on said motor and a follower mounted on a pivot arm connected to said mirror driven by said cam, wherein said follower comprises a compressed gas spring for pressing said follower against said cam.

2. A scanning system for a laser beam and a return light in a LIDAR imaging system comprising:
    a flat mirror having reciprocating rotary motion around a horizontal axis for a vertical scan of an illuminating laser beam and a return light, said reciprocating rotary motion of said mirror driven by a continuously rotating motor, a cam mounted on said motor and a follower mounted on a pivot arm connected to said mirror and driven by said cam, wherein said cam is in the form of a groove formed in a rotating disk.

3. The scanning system of claim 2 wherein said follower moves inside said groove.

* * * * *